United States Patent [19]
Hofmeister

[11] Patent Number: 6,091,864
[45] Date of Patent: *Jul. 18, 2000

[54] LINEAR OPTICAL MODULATOR FOR PROVIDING CHIRP-FREE OPTICAL SIGNALS

[75] Inventor: Rudolf J. Hofmeister, Walnut, Calif.

[73] Assignee: Ortel Corporation, Alhambra, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/838,737

[22] Filed: Apr. 10, 1997

[51] Int. Cl.$^7$ ........................................... G02F 1/035
[52] U.S. Cl. .................................. 385/2; 385/3; 359/254; 359/279
[58] Field of Search ................................... 359/254, 279, 359/181, 183; 385/2, 3

[56] References Cited

U.S. PATENT DOCUMENTS

| | | | |
|---|---|---|---|
| 4,223,977 | 9/1980 | Papuchon et al. | 350/96.11 |
| 4,390,236 | 6/1983 | Alferness | 350/96.14 |
| 4,448,479 | 5/1984 | Alferness | 350/96.14 |
| 4,776,657 | 10/1988 | Reeder | 350/96.14 |

(List continued on next page.)

OTHER PUBLICATIONS

Bodeep, G.E. et al., "Comparison of Second– and Third–Order Distortion in Intensity Modulated InGaAsP Lasers and a LiNbO$_3$ External Modulator," OFC '89, paper WK–2, 1 pg.

Childs, R.B. et al., "Predistortion Linearization of Directly Modulated DFB Lasers and External Modulators for AM Video Transmission," *Technical Digest, Optical Fiber Communication Conf.*, Optical Society of America, Washington, D.C., 1990, paper WH–6, 1 pg.

(List continued on next page.)

*Primary Examiner*—Georgia Epps
*Assistant Examiner*—Margaret Burke
*Attorney, Agent, or Firm*—Christie, Parker & Hale, LLP

[57] ABSTRACT

A dual stage optical modulator is disclosed that uses optical predistortion to achieve a high degree of linearity and also provides signals having substantially no residual phase modulation, or chirp. The modulator allows fiber optic transmission over fibers having a zero dispersion wavelength that is significantly different from the operating wavelength of the source laser without a chirp-induced dispersion penalty. In one embodiment of the modulator, an input Y-junction splits an optical input signal into a first interferometer, also referred to as a phase/intensity modulator, having first and second interferometer arms and an electrode structure for modulating the split signal. The electrode structure includes a pair of ground electrodes and a modulating electrode for receiving a first RF modulating voltage and associated DC bias. The modulating electrode is positioned between the interferometer arms but is offset from the center of the arms for providing a first asymmetric electro-optic effect through the introduction of intensity modulation and residual phase shift in the split signals. The split signals are then mixed in unequal proportions in a directional coupler and are separated into a second phase/intensity modulator that is substantially similar to the first, but which receives a second RF modulating voltage. The signals from the second phase/intensity modulator are again mixed in unequal proportions in a second directional coupler which couples the signals and provides first and second optical output signals. Linearization is achieved through optical predistortion by adjusting the DC biases and attenuating the second modulating voltage with respect to the first such that any distortion generated in the first interferometer is canceled in the second interferometer. Chirp introduced in the signals by the first interferometer is reduced in the second interferometer and directional couplers and is eliminated in at least one of the output signals by appropriately selecting the amount of asymmetric phase distortion applied to the signal in each stage.

31 Claims, 14 Drawing Sheets

U.S. PATENT DOCUMENTS

| | | | |
|---|---|---|---|
| 4,832,431 | 5/1989 | Nolting et al. | 350/96.14 |
| 4,843,350 | 6/1989 | Nazarathy et al. | 332/7.51 |
| 4,843,586 | 6/1989 | Nazarathy et al. | 364/822 |
| 4,882,775 | 11/1989 | Coleman | 455/617 |
| 4,932,736 | 6/1990 | Su | 350/96.14 |
| 4,934,775 | 6/1990 | Koai | 350/96.14 |
| 4,934,776 | 6/1990 | Koai | 350/96.14 |
| 4,936,645 | 6/1990 | Yoon et al. | 350/96.14 |
| 4,947,170 | 8/1990 | Falk | 341/137 |
| 4,984,861 | 1/1991 | Suchoski, Jr. et al. | 350/96.11 |
| 4,993,798 | 2/1991 | Thylen | 350/96.15 |
| 4,997,245 | 3/1991 | DuPuy et al. | 350/96.14 |
| 5,002,353 | 3/1991 | Johnson | 350/96.14 |
| 5,010,346 | 4/1991 | Hamilton et al. | 341/137 |
| 5,015,053 | 5/1991 | Johnson | 350/96.14 |
| 5,031,235 | 7/1991 | Raskin et al. | 455/612 |
| 5,040,865 | 8/1991 | Chen et al. | 350/96.14 |
| 5,076,655 | 12/1991 | Bridges | 385/3 |
| 5,101,450 | 3/1992 | Olshansky | 385/3 |
| 5,109,441 | 4/1992 | Glaab | 385/1 |
| 5,111,517 | 5/1992 | Riviere | 385/11 |
| 5,148,503 | 9/1992 | Skeie | 385/3 |
| 5,161,206 | 11/1992 | Djupsjöbacka | 385/2 |
| 5,168,534 | 12/1992 | McBrien et al. | 385/3 |
| 5,184,242 | 2/1993 | Henmi et al. | 359/181 |
| 5,249,243 | 9/1993 | Skeie | 385/3 |
| 5,278,923 | 1/1994 | Nazarathy et al. | 385/3 |
| 5,359,449 | 10/1994 | Nishimoto et al. | 359/181 |
| 5,361,319 | 11/1994 | Antos et al. | 385/123 |
| 5,373,382 | 12/1994 | Pirio et al. | 359/181 |
| 5,408,544 | 4/1995 | Seino | 385/3 |
| 5,473,458 | 12/1995 | Mamyshev et al. | 359/161 |
| 5,515,196 | 5/1996 | Kitajima et al. | 359/180 |
| 5,621,560 | 4/1997 | Wood | 359/161 |
| 5,745,613 | 4/1998 | Fukuchi et al. | 385/24 |
| 5,805,321 | 9/1998 | Ooi et al. | 359/135 |

OTHER PUBLICATIONS

Donaldson, A. et al., "Linearity Considerations in High Performance Amplitude Modulators," *IEE Colloquium on 'Analogue Optical Communications,'* Digest No. 156, Dec. 1989, pp. 4/1–5.

Farwell, M. et al., "An Electrooptic Intensity Modulator with Improved Linearity," *IEEE Photonics Technology Letters,* vol. 3, No. 9, 1991, pp. 792–794.

Kanbara, H. et al., "Optical Kerr Shutter Using Organic Nonlinear Optical Materials in Capillary Waveguides," *IEEE Photonics Technology Letters,* vol. 3, No. 9, Sep. 1991, pp. 795–797.

Koai, K.T. et al., "Digital and Quasi–Linear Electrooptic Modulators Synthesized from Directional Couplers," *IEEE Journal of Quantum Electronics,* vol. QE–22, No. 12, Dec. 1986, pp. 2191–2194.

Lam, J.F. et al., "A Novel Optical Modular System with Enhanced Linearization Properties," *IEEE Transactions Photonics Technology Letters,* vol. 3, No. 12, Dec. 1991, pp. 1102–1104.

Lin, Z.–Q. et al., "Reduction of Imtermodulation Distortion of Interferometric Optical Modulators Through Incoherent Mixing of Optical Waves," *Electronics Letters,* vol. 26, No. 23, Nov. 8, 1990, pp. 1980–1982.

Lin, Z.–Q. et al., "Waveguide Modulators with Extended Linear Dynamic Range—A Theoretical Prediction," *IEEE Photonics Technology Letters,* vol. 2, No. 12, Dec. 1990, pp. 884–886.

Liu, P.–L. et al., "In Search of a Linear Electrooptic Amplitude Modulator," *SPIE Conference,* 1990, 11 pgs.

Liu, P.–L. et al., "In Search of a Linear Electrooptic Amplitude Modulator," *IEEE Photonics Technology Letters,* vol. 3, No. 2, Feb. 1991, pp. 144–146.

Saleh, A.M. et al., "Compensation of Nonlinearity in Semiconductor Optical Amplifiers," *Electronic Letters,* vol. 24, No. 15, Jul. 21, 1998, pp. 950–952.

Skeie, H. et al., "Linearization of Electro–optic Modulators by a Cascade Coupling of Phase Modulating Electrodes," *SPIE Conference,* vol. 1583, Sep. 1991, pp. 153–164.

Suto, K. et al., "Intermodulation Distortion in 48 TV Channel FM–FDM Optical Transmission," *IEEE Photonics Technology Letters,* vol. 3, No. 9, Sep. 1991, pp. 844–846.

Wu, J. et al., "Linearization of Laser–Diode Nonlinearity of Broadband Analogue Fibre–Optic Communication," *International Journal of Optoelectronics,* vol. 3, No. 6, 1988, pp. 523–533. month.

Zolotov, E.M. et al., "Integrated Optical Mach–Zehnder Modulator with a Linearized Modulation Characteristic," *Sov. J. Quantum Electron.,* vol. 18, No. 3, Mar. 1988, pp. 401–402.

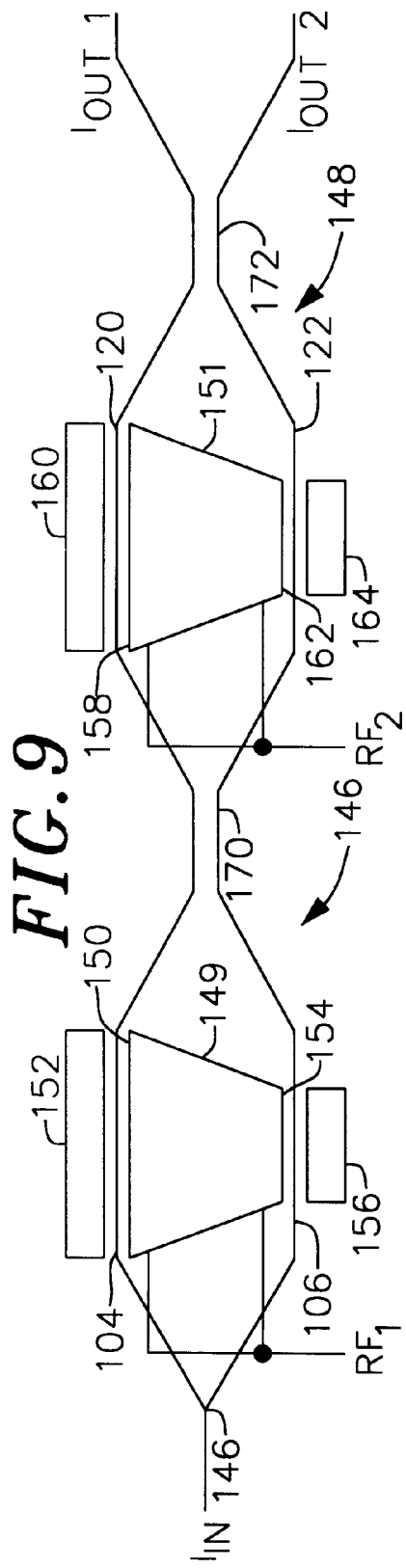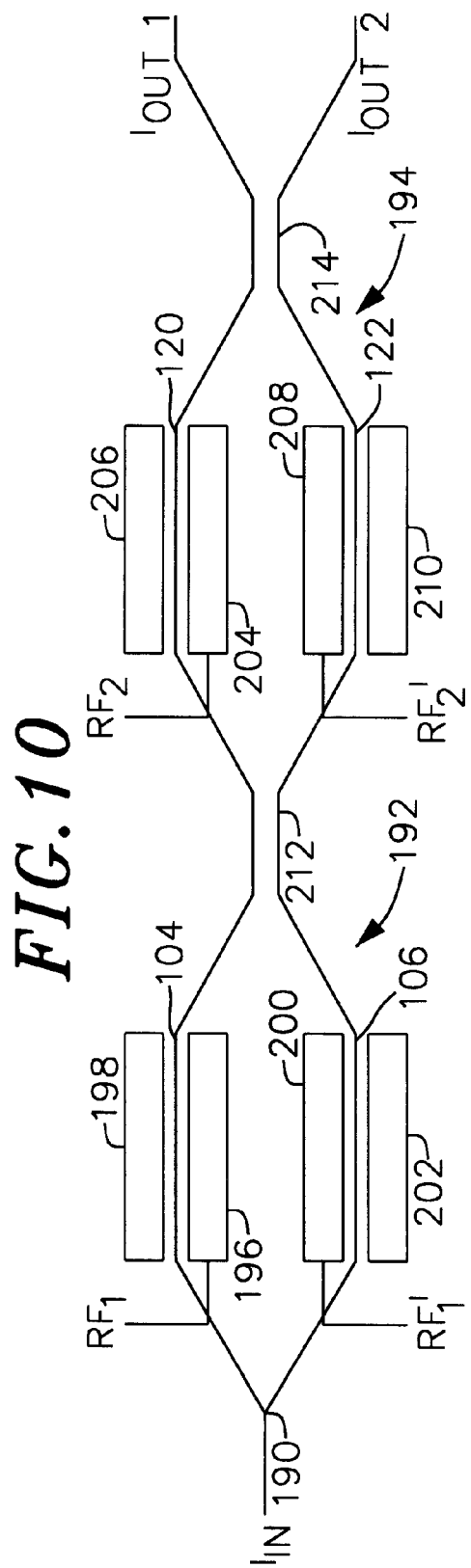

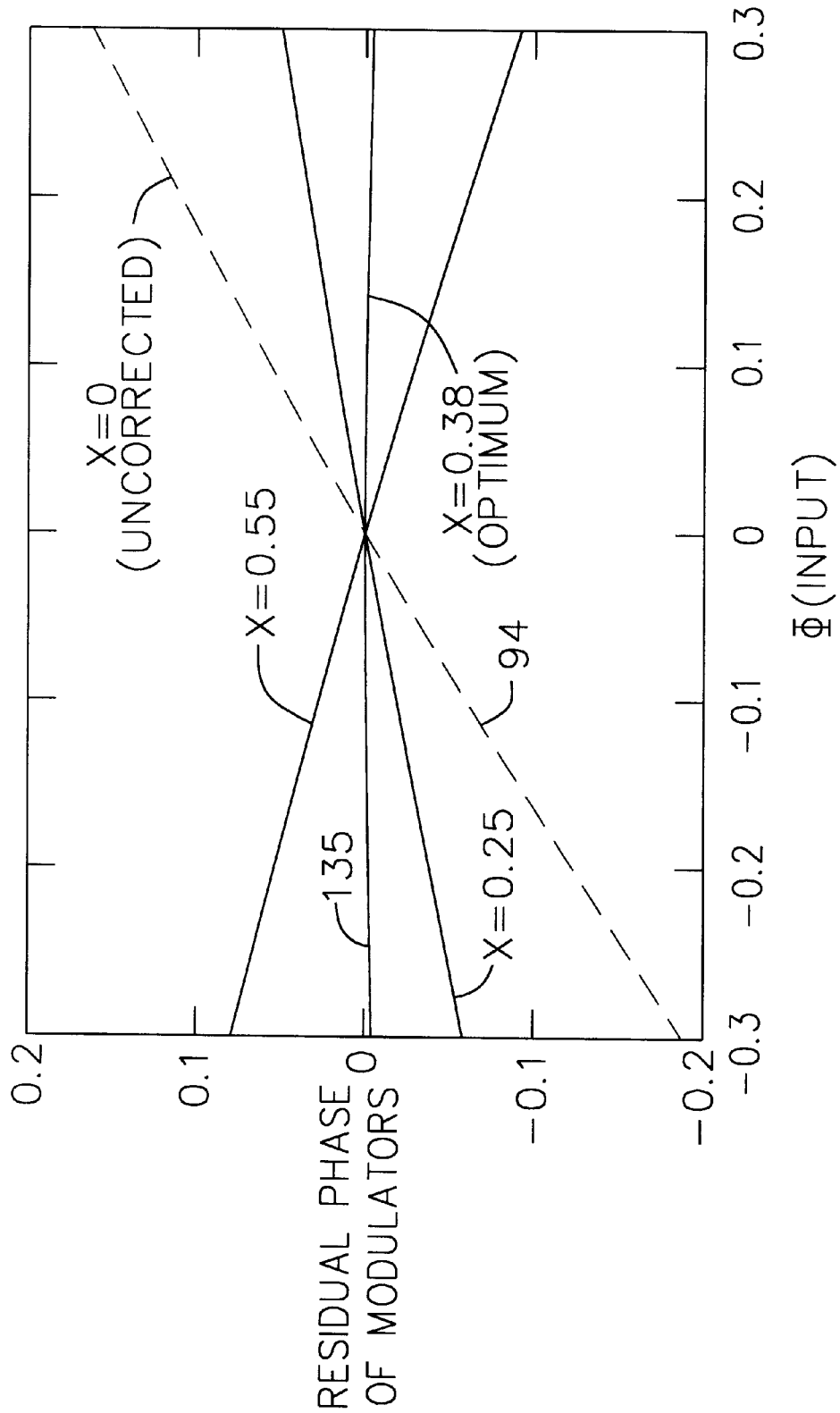

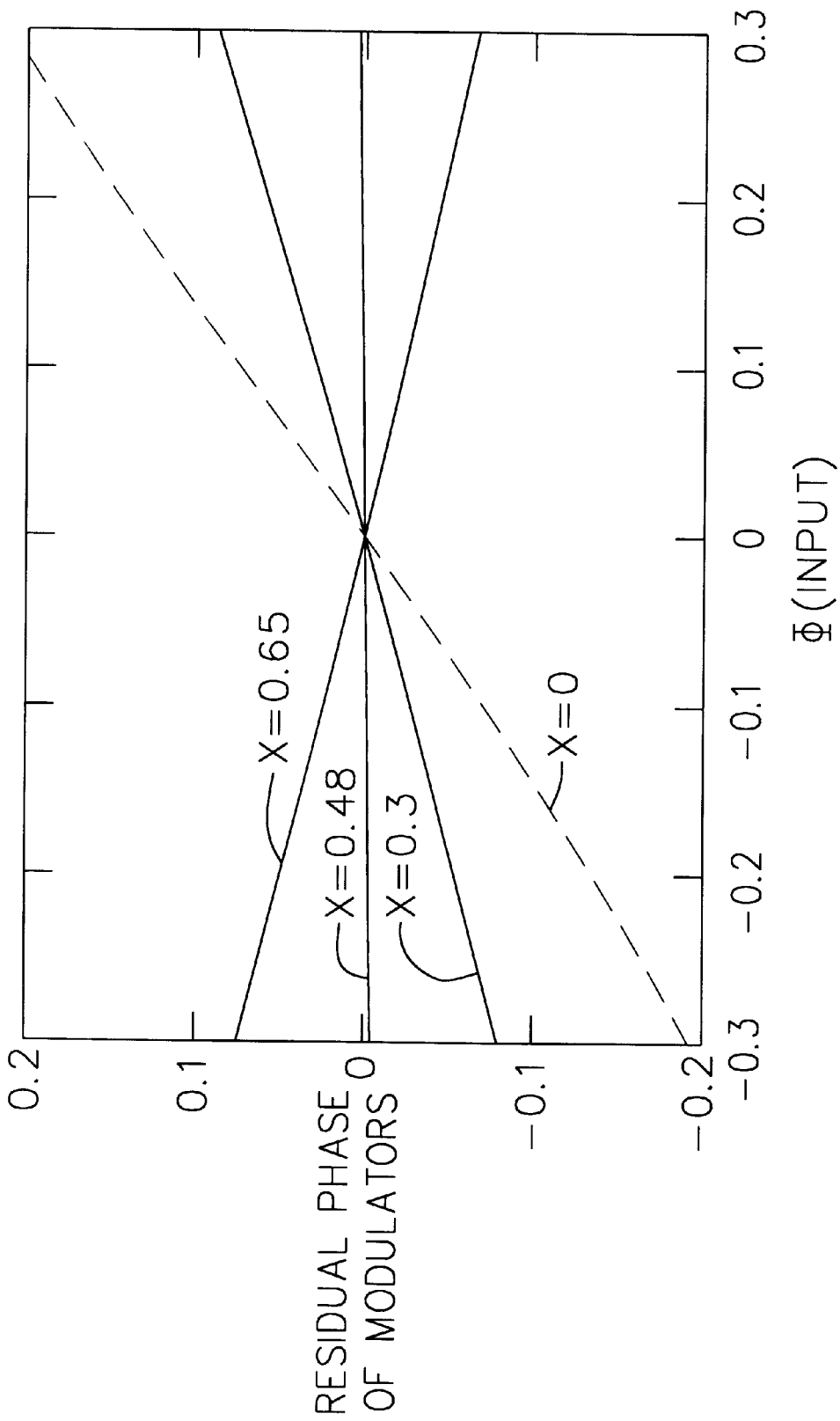

LINEAR OPTICAL MODULATOR FOR PROVIDING CHIRP-FREE OPTICAL SIGNALS

FIELD OF THE INVENTION

This invention relates generally to optical modulators, and more particularly to an optical modulator that uses optical predistortion to maximize linearity and also provides signals having substantially no chirp. The modulator enables low attenuation, low dispersion fiber optic transmission over fibers having a zero dispersion wavelength that is significantly different from the operating wavelength of the source laser.

BACKGROUND OF THE INVENTION

Over the last several years, many fiber optic network providers have included 1550 nm links in their newer network buildouts, some of which have older fibers, creating networks in which 1550 nm source lasers transmit into conventional optical fibers optimized for 1310 nm transmission. One advantage of 1550 nm transmission is its superior attenuation performance. In conventional $SiO_2$-based single-mode optical fibers, for example, the attenuation of 1550 nm optical signals is about 0.2 dB/km, while the attenuation of 1310 nm signals in the same fiber is about 0.35 dB/km. The lower optical loss at 1550 nm allows for longer, unrepeatered link spacings.

Another advantage of 1550 nm transmission is the recent commercial availability of low cost, low noise rare earth ion doped optical fiber amplifiers. The development of these amplifiers has made it possible to reamplify and distribute signals without optical detection and regeneration, resulting in substantial cost savings. To date, the most widely used rare earth ion doped amplifiers make use of erbium doped fibers that operate in the range from about 1520–1565 nm. Because of these advantages, transmission at wavelengths of 1550 nm has become a practical and desirable option to traditional 1310 nm transmission.

Despite the advantages of 1550 nm operation, unacceptable levels of chromatic dispersion can occur when 1550 nm wavelengths are transmitted through conventional optical fibers. Dispersion is a linear effect present in an optical fiber whereby different frequencies of light travel with different group velocities through the fiber. Fiber optimized for 1310 nm wavelength transmission has a zero-dispersion wavelength at 1310 nm and dispersion of up to 17 ps/km/nm at 1550 nm. The higher dispersion at 1550 nm is a significant problem in longer links.

The effects of dispersion are particularly pronounced when present with any type of source chirp. The term "chirp" generally refers to the amount of frequency modulation or phase modulation of the optical signal induced by the intensity modulation process. In CATV networks, the combination of either type of chirp and fiber dispersion results in a significant dispersion penalty as the peaks of the AM signals are delayed relative to the valleys, resulting in unacceptable signal distortion. This distortion primarily manifests itself in a frequency-dependent contribution to system level composite second-order distortion ("CSO"). In a distributed feedback ("DFB") laser, applying the signal directly to the laser leads to a large amount of chirp. Accordingly, direct modulation of the 1550 nm source laser is generally not a viable option in most existing fiber optic links having fibers optimized for 1310 nm. Instead, relatively low chirp external modulation is typically used.

One commonly used external modulator is known as the Mach Zehnder modulator. When driven in the push-pull configuration, the Mach Zehnder produces an output signal exhibiting substantially zero chirp. Although beneficial for reducing the effects of dispersion in 1550 nm links, a drawback of the conventional Mach Zehnder modulator is that its output does not exhibit a high degree of linearity. In practice, second order distortion is eliminated by appropriately biasing the modulator. However, separate electrical predistorters are used to eliminate third order distortion. By using separate components for linearization, however, environmental stability, component matching and other considerations must be taken into account.

In response to the limitations in the linearity of the traditional Mach Zehnder, optically linearized modulators have been developed that include a pair of cascaded Mach Zehnder modulators. By appropriately varying the bias current and the amount of modulating voltage applied to each of the individual Mach Zehnders, both second and third order distortion components are canceled and a relatively high degree of linearity can be achieved, obviating the requirement of a separate predistorter. One drawback of these modulators for 1550 nm links is that they induce a substantial amount of modulator chirp, approximately 3.5 MHz/1% OMI at 500 MHz, where OMI refers to the optical modulation index. Although the magnitude of the modulator chirp is generally much smaller than that of laser chirp in a DFB laser, in conjunction with dispersion the modulator chirp caused by the cascaded Mach Zehnder detrimentally affects performance in any 1550 nm link having 1310 nm optimized fibers, and is unacceptable in longer, high performance 1550 nm links.

In view of the foregoing, those skilled in the art would prefer an optical modulator that exhibits the relatively high degree of linearity of the cascaded Mach Zehnder modulators, and also the substantially zero chirp exhibited by the traditional Mach Zehnder. Such a modulator would be particularly useful for enabling 1550 nm transmission over existing fibers having a zero-dispersion wavelength centered around 1310 nm.

SUMMARY OF THE INVENTION

The present invention provides a novel optical modulator that uses optical predistortion to maximize linearity and also produces signals having substantially no modulator chirp. In a presently preferred embodiment, the optical modulator includes first and second optical interferometer stages, each stage also referred to as phase/intensity modulator. An input Y junction receives an optical signal from a source laser and splits the optical signal into a pair of waveguide paths (also referred to as interferometer arms) in the first interferometer. An electrode structure is provided that enables RF modulation through introduction of a first asymmetric electro-optical effect on the split signals. The asymmetric electro-optical effect is accomplished, for example, by varying the strength of the electric field applied by the electrodes across each of the arms, causing both intensity modulation and a residual phase shift in the optical signals. The signals are then mixed in unequal proportions in a first directional coupler between the first and second interferometers. In the second interferometer, the mixed signals are again separated into two additional interferometer arms having an associated electrode structure that enables further RF modulation through introduction of a second asymmetric electro-optical effect on the separated signals. The separated signals are then remixed in unequal portions in a second directional coupler which provides a pair of optical output signals.

Linearity is achieved in the output signals through optical predistortion by adjusting the biases and the relative amounts and phases of RF modulating voltage applied to the electrode structures such that any distortion components introduced by the first interferometer are canceled in the second interferometer. In addition, at least one of the output signals is made chirp-free by applying the asymmetric phase shifts in conjunction with the proportion of mixing in the directional couplers in such a way that any chirp introduced into the split optical signals by the first interferometers is substantially compensated for in the second interferometer and the directional couplers and is eliminated in at least one of the output signals. Signal modulation and linearity are not affected by the asymmetric phase shifts because there is no change in the net, or relative, phase shift between the split signals, only a change in the absolute phase shift applied to the individual signals. The modulated, chirp-free optical signal can then be introduced into an optical fiber having a zero-dispersion wavelength that is substantially different from the operating wavelength of the source transmitter without incurring a chirp-induced dispersion penalty.

BRIEF DESCRIPTION OF THE DRAWINGS

These and other features and advantages of the present invention will become more apparent in light of the following detailed description read in conjunction with the accompanying drawings, in which:

FIG. 9 is schematic view of another alternate embodiment of the optical modulator according to the present invention in which the effective length of the electrodes across one of the interferometer arms in each modulator stage is varied to provide the asymmetric electro-optic effects;

FIG. 10 is a schematic view of still another alternate embodiment of the present invention in which separate pairs of RF electrodes with independently adjustable inputs are provided on each interferometer arm to enable introduction of the asymmetric electro-optic effects;

FIGS. 14a–c are qualitative graphical depictions of residual phase modulation vs. intensity modulation for the conventional optically linearized modulator and the modulator according to the present invention.

In FIGS. 4–10, similar reference numerals are used to designate similar parts. Similar reference numerals are also used to designate similar parts in FIGS. 3, 12 and 13.

DETAILED DESCRIPTION

Figure 1:
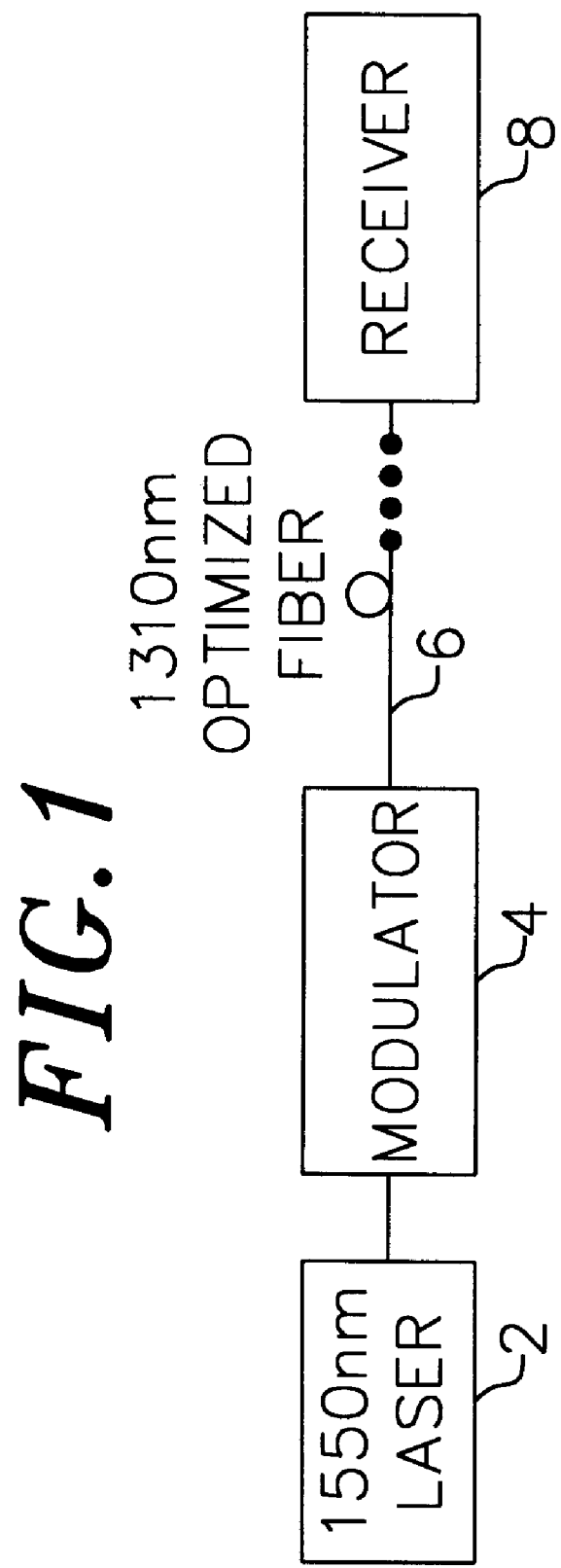
FIG. 1 is a block diagram of a fiber optic system including an external optical modulator.

Referring to FIG. 1, a fiber optic communications link includes an optical source 2, such as a distributed feedback ("DFB") laser, for producing a 1550 nm wavelength continuous wave ("CW") optical carrier signal. An external modulator 4 modulates the optical signal with an external time-varying RF signal, such as an amplitude modulated CATV signal. The modulated optical signal is introduced into conventional fiber optic cable 6 having a zero-dispersion wavelength centered about 1310 nm for transmission to a remote receiver 8. As is well-known, other components such as optical fiber amplifiers, isolators and repeaters (not shown) may also be included in the link.

Figure 2:
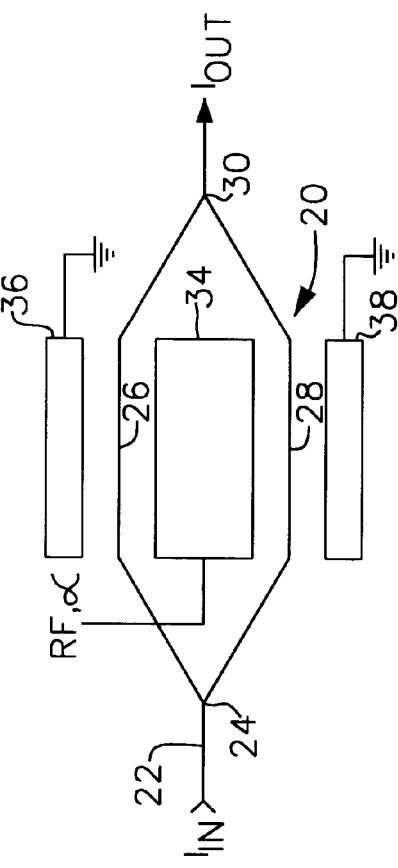
FIG. 2 is a schematic diagram of a conventional Mach Zehnder modulator.

Currently available external modulators include the single-stage balanced Mach Zehnder modulator and the optically linearized cascaded Mach Zehnder modulator. Referring to FIG. 2, the balanced Mach Zehnder modulator 20 is typically formed on a lithium niobate substrate (not shown) and includes an input 22 for receiving optical signal $I_{IN}$. The signal is split at a Y-junction 24 into upper and lower parallel interferometer arms formed of spaced-apart waveguide paths 26, 28 and is recombined in a second Y-junction 30 which provides a modulated optical output signal $I_{OUT}$. In a typical embodiment, an RF modulating electrode 34, such as a bias tee electrode, is positioned symmetrically between the upper and lower interferometer arms. A bias tee electrode refers to an electrode that is used to apply both an RF and a bias signal which are summed with a bias tee (not shown). Upper and lower ground electrodes 36, 38, which typically have the same effective length as one another, are each positioned parallel to the RF electrode opposite the respective arm, and are located at the same distance from the RF electrode.

In operation, an RF modulating voltage such as an amplitude modulated CATV signal, is applied to the RF electrode, causing time-varying oppositely directed electric fields to be applied to the interferometer arms. In accordance with the well-known electro-optic effect, the applied fields cause the index of refraction across the arms to vary with the changing amplitude of the modulating signal, thereby phase modulating the light in each of the arms. The phase shifts applied to the signals in each of the parallel arms are equal and opposite. As the light is then recombined at the second Y junction 30, the in-phase components of the signals are added and the out-of-phase components are subtracted, producing an intensity modulated output signal containing no residual phase modulation. Because there is only intensity modulation and no residual phase modulation, the single-stage balanced Mach Zehnder provides an output that is free of modulator chirp.

Although useful for providing a modulated output that does not contribute to dispersion-induced CSO, a drawback of the Mach Zehnder in wideband applications such as CATV transmission is that its output light power vs. modulating voltage transfer characteristic is nonlinear as a result of modulator nonlinearities and harmonic distortion. By appropriately adjusting the bias α to the RF input, cancellation of even order distortion can be accomplished. Reduction of third order distortion ("CTB") to acceptable levels, however, can only be obtained by the use of an electrical predistorter (not shown) that precisely compensates for the third order distortion generated by the modulator. A disadvantage of having to use separate external predistortion is that environmental instabilities, component matching and other considerations must be taken into account.

Figure 3:
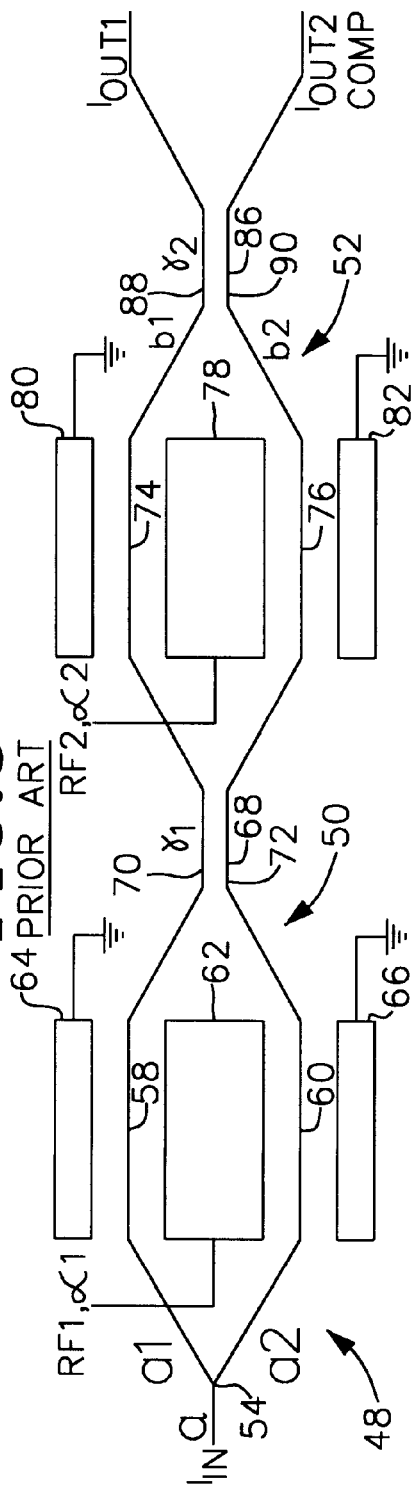
FIG. 3 is a schematic diagram of an exemplary conventional optically linearized modulator consisting of a pair of cascaded Mach Zehnder modulators.

Referring to FIG. 3, the prior art cascaded Mach Zehnder modulator 48 relies on optical predistortion instead of external predistortion to linearize the modulator output. Because modulation and distortion correction both occur on the same lithium niobate substrate, the performance of the modulator is less susceptible to variation due to environmental instabilities. Exemplary cascaded Mach Zehnder modulators are disclosed, for example, in Skeie, U.S. Pat. No. 5,249,243, the contents of which are hereby incorporated by reference. One such modulator consists of two identical Mach Zehnder-type interferometers 50, 52 arranged in first and second stages. An optical input signal $I_{IN}$ is split in a Y-junction 54 into the first interferometer which includes substantially parallel upper and lower interferometer arms formed by spaced apart waveguide paths 58, 60 and an electrode structure consisting of an RF electrode 62, such as a bias tee electrode, and ground electrodes 64, 66. In some embodiments, due to manufacturing considerations involving acoustic resonances, for example, the upper and lower arms may be slightly tilted away from being parallel. Like the single balanced Mach Zehnder, the RF electrode is positioned symmetrically between the upper and lower arms and at substantially equal distances between the ground electrodes. The ground electrodes in some embodiments may be flared out slightly. The RF electrode 62 receives a first RF modulating voltage RF1 and associated bias α1 and induces oppositely directed electric fields across the first stage interferometer arms. The split signals from the first stage interferometer are then mixed in a first directional coupler 68, formed of closely spaced waveguide segments 70, 72 having coupling angle $\gamma_1$, and separated into the second interferometer. The second stage Mach Zehnder also includes parallel upper and lower interferometer arms formed by spaced-apart waveguide paths 74, 76 and a symmetrically-positioned electrode structure consisting of an RF electrode 78 and ground electrodes 80, 82. The electrode structure receives a second RF modulating voltage RF2, which is proportional to RF1, and a bias α2 and induces oppositely directed electric fields across the second stage waveguide paths. A second directional coupler 86, formed of closely spaced waveguide segments 88, 90 having coupling angle $\gamma_2$, is connected to the output of the second interferometer for coupling the parts of the signal and providing complementary modulated optical signals $I_{OUT1}$ and $I_{OUT2}$. For operation in the linearized configuration, the coupling angles, bias levels to each electrode and the splitting ratio between RF1 and RF2 are selected so that distortion introduced by the first interferometer is canceled in the second interferometer.

Although useful for providing optical predistortion, a drawback of the cascaded Mach Zehnder is that its modulated output signals exhibit both intensity modulation and residual phase modulation when the modulator is operated in the linearized configuration. The transfer matrix for each of the interferometers is given by:

$$M_P = \begin{pmatrix} e^{i\phi/2} & 0 \\ 0 & e^{-i\phi/2} \end{pmatrix} \quad (1)$$

where $\phi$ is the phase shift induced by the signal on the RF electrode and associated bias applied to the RF electrode. In some cases, as is well known, the bias may be applied through a separate bias electrode.

The transfer matrix for each of the directional couplers is given by:

$$M_{DC} = \begin{pmatrix} \cos\gamma & -i\sin\gamma \\ -i\sin\gamma & \cos\gamma \end{pmatrix} \quad (2)$$

where $\gamma$ is the coupling angle.

In operation, optical input signal $I_{IN}$ with amplitude "a" enters the modulator and is split 50:50 into signals a1 and a2 in the first modulator, each having a magnitude $a/\sqrt{2}$. In the first modulator, the applied RF modulating voltage RF1 shifts the phase of the light equally and oppositely. The light is then interfered at the first directional coupler and modulated in the second interferometer to produce intermediate signals b1 and b2 before the second directional coupler.

$$\begin{pmatrix} b_1 \\ b_2 \end{pmatrix} = \frac{a}{\sqrt{2}} \begin{pmatrix} (\cos\gamma e^{-i\phi_1} - i\sin\gamma e^{i\phi_1})e^{-i\phi_2} \\ (\cos\gamma e^{i\phi_1} - i\sin\gamma e^{-i\phi_1})e^{i\phi_2} \end{pmatrix} \quad (3)$$

where $\phi_1 = RF1 + \alpha_1$, RF1 is the RF modulating signal and $\alpha_1$ is the signal bias, and where $\phi_2 = RF2 + \alpha_2$, RF2=kRF1 is the RF modulating signal, $\alpha_2$ is the associated bias applied to the second RF electrode, and k is the splitting ratio RF2/RF1 between the first and second modulating voltages. In practice, the bias voltages on the modulator are set so that the values of α1 and α2 are nominally zero.

Assuming equal coupling angles $\gamma_1 = \gamma_2 = \gamma$, the outputs $c_i$ from the modulator are then:

$$c_1 = b_1 \cos\gamma - ib_2 \sin\gamma \quad (4)$$

$$c_2 = b_2 \cos\gamma - ib_1 \sin\gamma$$

Since the output intensity $I_{OUT} = |c|^2$, the transfer function for the modulator is then:

$$I_{OUT} = I_{IN}\left[1 + \frac{1}{2}\sin(4\gamma)\sin(\phi_1)(1 + \cos(\phi_2)) + \sin(2\gamma)\sin(\phi_2)\cos(\phi_1)\right] \quad (5)$$

For operation in the linearized configuration with optimal modulator sensitivity, it can be shown that $\gamma_1 = \gamma_2$ is about 63 degrees and k=0.5.

The optically linearized modulator functions essentially as two balanced Mach Zehnder modulators, where the distortion induced by the first modulator is canceled by the distortion of the second modulator. Viewed independently, each stage of the cascaded Mach Zehnder produces an output signal that is substantially chirp-free if $\gamma_1 = \gamma_2 = 45$ degrees. When operated in the linearized configuration, however, the power transfer between the two arms is unequal, approximately 75:25, due to the non-45 degree coupling angles of the directional couplers. Consequently, unlike the balanced Mach Zehnder, the phase shifts introduced in the upper and lower interferometer arms of the cascaded Mach Zehnder do not cancel, resulting in output signals that include both intensity modulation and residual phase shift. The dashed line plot 94 in FIG. 14, obtained using commercially available MathCad® software, shows the residual phase shift in the output of the cascaded Mach Zehnder vs. intensity modulation, and demonstrates that the phase of the modulator is not constant, so the chirp, which is the derivative of the phase, is not zero. When transmitted through 1310 nm optimized fibers, this chirp contributes to unacceptable levels of dispersion-induced CSO distortion.

The present invention provides both the benefits of optical predistortion found in the cascaded Mach Zehnder modulator, and the substantially chirp-free output found in the single stage Mach Zehnder operated in the push-pull configuration. The present invention recognizes, among other things, that by modulating both the phase and intensity of the optical signal at each interferometer stage through the induction of asymmetric electro-optic effects, residual phase shift in at least one of the optical output signals can be significantly reduced and substantially eliminated while maintaining the benefits of optical predistortion.

Figure 4:
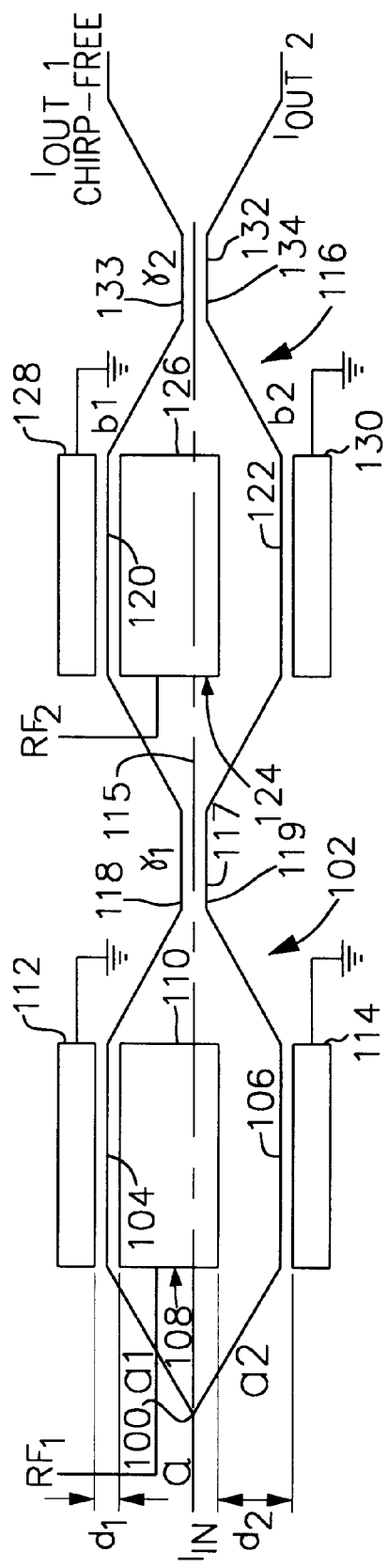
FIG. 4 is a presently preferred embodiment of the optical modulator according to the present invention in which the RF modulating electrodes are offset from the center of the waveguide paths to provide asymmetric electro-optic effects.

Referring to FIG. 4, in a presently preferred embodiment of the optical modulator according to the present invention, a Y-junction 100 splits an optical carrier signal $I_{IN}$ into a first stage interferometer, or phase/intensity modulator, 102 having parallel upper and lower interferometer arms formed of waveguide paths 104, 106 and an electrode structure 108 for applying a first asymmetric phase shift to the split signal. The terms "upper" and "lower" as used herein are to for distinguishing the interferometer arms; no physical placement or location of the arms is implied. The electrode structure consists of an RF electrode 110, such as a bias tee electrode, and upper and lower ground electrodes 112, 114 that are all substantially parallel to one another and to the waveguide paths. Unlike the balanced Mach Zehnder, the RF electrode is offset from the centerline 115 of the upper and lower interferometer arms and is positioned at unequal distances d1 and d2, respectively, from the upper and lower ground electrodes. The first interferometer is coupled to a second stage interferometer, or phase/intensity modulator, 116 that is substantially similar to the first stage interferometer through a directional coupler 117 having a coupling angle $\gamma_1$. The directional coupler mixes the split signals in closely-spaced waveguide segments 118, 119 and separates the signals into the upper and lower interferometer arms 120, 122 of the second interferometer. Similar to the first interferometer electrode structure, second interferometer electrode structure 124 for applying a second asymmetric phase shift to the split signal, consists of an RF electrode 126 and upper and lower substantially parallel ground electrodes 128, 130. The second interferometer RF electrode is also offset from the centerline of the upper and lower interferometer arms and is positioned at unequal distances d1 and d2, respectively, from the upper and lower ground electrodes. The signals in the upper and lower arms of the second interferometer are coupled in a second directional coupler 132 having a coupling angle $\gamma_2$ for mixing the signals in closely-spaced waveguide segments 133, 134 and providing first and second output signals $I_{OUT1}$ and $I_{OUT2}$.

The first stage electrode structure 108 is coupled to first RF input RF1 for receiving a first RF modulating voltage and associated bias $\alpha1$. Similarly, the second stage electrode structure 124 is coupled to second RF input RF2 for receiving a second RF modulating voltage and associated bias $\alpha2$, where RF2=k·RF1, and k, as in the cascaded Mach Zehnder, is the RF splitting ratio between the voltages applied in the first and second stages.

The asymmetric phase shifts are accomplished in the preferred embodiment of FIG. 4 by applying electric fields of differing strength across each of the interferometer arms, the differing electric fields being produced as a result of the unequal distances d1 and d2 between the RF electrode and the upper and lower ground electrodes. In the preferred embodiment, d2=(1+x)/(1−x)·d1, where x is indicative of the amount of asymmetry. Accordingly, the applied fields in the upper arm and lower arms are also related by the ratio (1+x)/(1−x), and induce corresponding absolute asymmetric phase shifts in the respective optical signal parts. Application of the absolute phase shifts in this manner ensures that the relative or net phase shift between the upper and lower arms is constant for proper intensity modulation of the optical signal. Since the asymmetric phase shifts in each interferometer strongly modulates both the phase and intensity of the optical signal at each stage of the modulator, the individual interferometers are also referred to as phase/intensity modulators.

Figure 5:
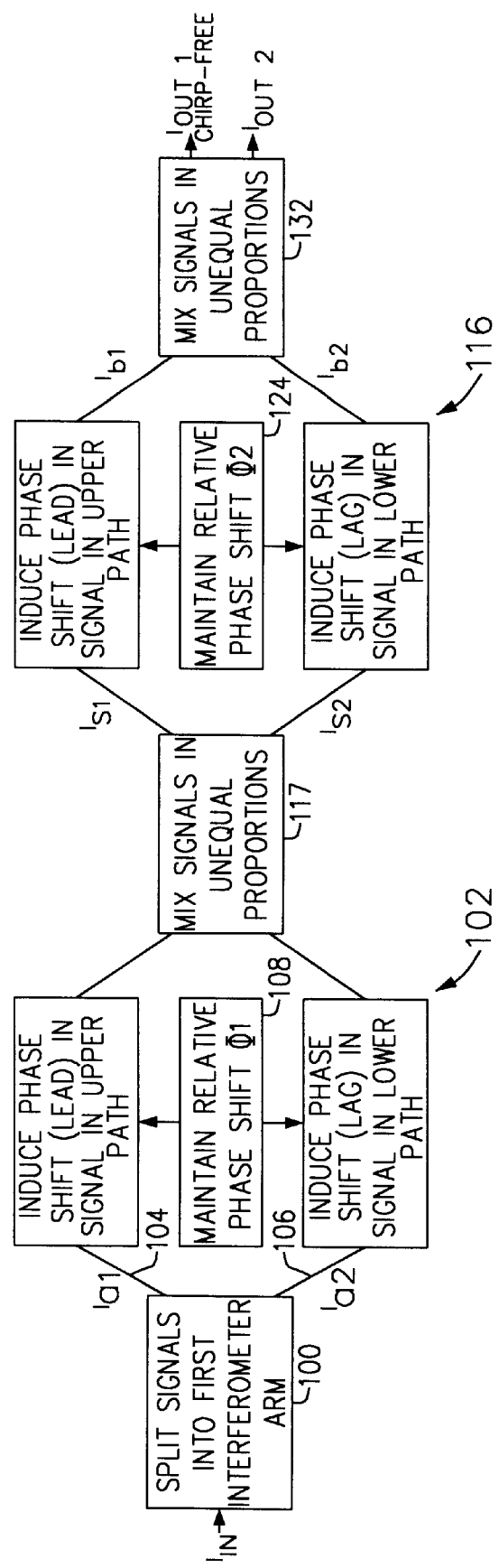
FIG. 5 is a block diagram illustrating the operation of the optical modulator according to the present invention

The block diagram of FIG. 5 illustrates the operation of the present invention. The optical signal $I_{IN}$ is split evenly in the Y-junction 100 between the upper and lower arms 104, 106 of the first phase/intensity modulator 102. The first stage electrode structure 108 applies a first asymmetric relative phase shift $\phi1$ to the optical signal by inducing a positive phase shift (lead) in the part of the optical signal $I_{a1}$ in the upper arm and a negative phase shift in the part of the optical signal $I_{a2}$ in the lower arm, the magnitude of the lead in this example being greater than that of the lag. As a result of the asymmetric phase shift, the optical signals delivered to the first directional coupler 117 include both intensity modulation and residual phase modulation. At the first directional coupler, signals $I_{s1}$ and $I_{s2}$ are formed, each having a phase that is the vector sum of a fraction of the lead from the upper path optical signal $I_{a1}$ and a fraction of the lag from the lower path signal $I_{a2}$. In the second phase/intensity modulator 116, the electrode structure 124 applies a second asymmetric relative phase shift $\phi2$ to the optical signal by inducing a lead in the part of the signal in the upper arm to form signal $I_{b1}$, and a lag in the part of the signal in the lower arm to form signal $I_{b2}$, the magnitude of the lead again being greater than that of the lag. In the second directional coupler 132, signals $I_{OUT1}$, and $I_{OUT2}$, are formed, each having a phase that is the vector sum of fraction of the lead from signal from the upper path optical signal $I_{b1}$ and a fraction of the lag from the lower path signal $I_{b2}$.

As with the cascaded Mach Zehnder, modulator linearity is maximized by appropriately selecting the coupling angles of the directional couplers, adjusting the bias levels to the modulating electrodes and attenuating RF2 by a fixed and predetermined amount with respect to RF1. Assuming coupling angles of $\gamma1=\gamma2=63$ degrees for linear operation as in the conventional cascaded Mach-Zehnder, more than 50% of the light is coupled between the upper and lower waveguides of each coupler. Accordingly, in the upper output arm there is a greater mix of the lower input signal and a lesser mix of the upper input signal, while on the lower arm the reverse is true. By appropriately selecting the amount of asymmetry introduced at each stage in conjunction with the coupling angles, the chirp introduced by the first phase/intensity modulator can be reversed in the second phase/intensity modulator and in the directional couplers and substantially eliminated in one of the optical output signals. Intensity modulation and linearity of the optical output signals are not affected by the asymmetric phase shift because only the absolute phases of the parts of the signals transmitted through the interferometer arms are altered. The net, or relative, phase shifts $\phi1$ and $\phi2$ between the signals in the upper and lower arms, which causes the intensity modulation, is not affected by the asymmetry.

Following the nomenclature used in equations (1) through (5) for derivation of the transfer function for the cascaded Mach Zehnder, the intermediate signals b1' and b2' analogous to b1 and b2 in equation (3) are given by:

$$\begin{pmatrix} b_1' \\ b_2' \end{pmatrix} = \frac{a}{\sqrt{2}} \begin{pmatrix} (\cos\gamma e^{-i\phi_1(1-x)} - i\sin\gamma e^{i\phi_1(1+x)})e^{-i\phi_2(1-x)} \\ (\cos\gamma e^{i\phi_1(1+x)} - i\sin\gamma e^{-i\phi_1(1-x)})e^{i\phi_2(1+x)} \end{pmatrix} \quad (6)$$

Inspection shows that:

$$b_i' = b_i e^{i(\phi_1+\phi_2)x} \quad (7)$$

Therefore, it follows that:

$$c_i' = c_i e^{i(\phi_1+\phi_2)x} \quad (8)$$

It can be seen that the output of the modulator, $|c_i'|^2 = I_{OUT}'$, is advanced in phase by a phasor which is proportional to x, but the intensity of the output is unchanged. Accordingly, for the optical modulator according to the present invention:

$$I_{OUT'} = c_i' c_i'^* = c_i c_i^* e^{i(\phi_1+\phi_2)x} e^{-i(\phi_1+\phi_2)x} = c_i c_i^* = I_{OUT} \quad (9)$$

Since $I_{OUT'} = I_{OUT}$, this demonstrates that the asymmetry introduced by the modulator does not affect the intensity transfer function, and generates only chirp.

The choice of optimum x is dictated only by the free parameters of equation (6) which are the RF splitting ratio k and the coupling angle $\gamma$. Since the optimum value of k depends on $\gamma$ for linear operation, the value of x is chosen in the preferred embodiment to cancel chirp. A numerical solution can be obtained for the optimum value of x as a function of $\gamma$ for the approximate range $\phi_1 \in (-0.3, 0.3)$ as shown in the following table, which suggests that a theoretical optimum value for the sum of k and x is approximately 0.88 for the exemplary embodiments indicated.

TABLE 1

| coupling angle ($\gamma$) | splitting ratio (k) | amount of asymmetry (x) |
|---|---|---|
| (a) 1.102 | 0.5 | 0.38 |
| (b) 1.083 | 0.46 | 0.41 |
| (c) 1.053 | 0.4 | 0.48 |

The parameters indicated in Table 1 are exemplary only, and may change depending on design specifications or desired results. Depending on the drive circuits and drive power, the optimum shifts. For example, at higher power, fifth order effects may have to be taken into account.

In practice, one first determines values for the splitting ratio and coupling angles which provide third order linearization. For example, for a given k, the only free parameter is the coupling angle $\gamma$, which is chosen to minimize the third order coefficient of $\phi_1$. The x term can be ignored in this calculation since it does not affect third order linearization. Once $\gamma$ and k are determined, x is varied until the phase of the output does not change with input $\phi_1$ (i.e., the residual phase in the output is constant).

Figure 14B:
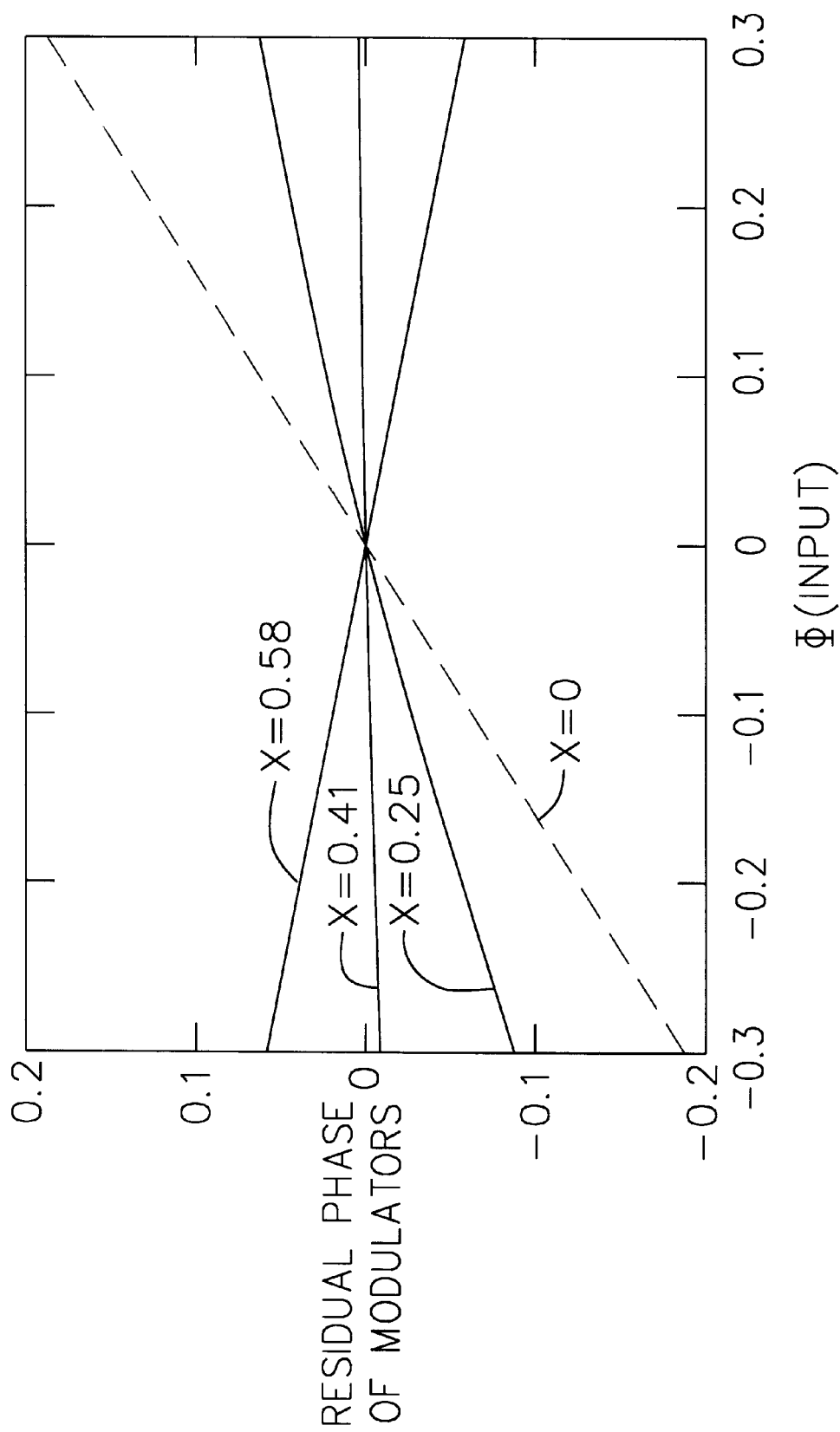

FIGS. 14a–c show plots of residual phase modulation in the optical output signal $I_{OUT1}$ vs. intensity modulation for the exemplary parameters indicated in the corresponding rows of Table 1. The graphs illustrate the substantially reduced residual phase modulation achieved through application of the asymmetric phase shifts of the present invention. In FIG. 14a, three separate values of x are plotted for the exemplary parameters k=0.5 and $\gamma$=1.102. For values of x in the range from about 0.25 to 0.55, substantial improvement over the uncorrected case (x=0) is demonstrated. By substantial improvement, it is meant that there is approximately a 50% reduction in residual phase modulation in the output of the modulator relative to the uncorrected case. One of ordinary skill in the art, however, would readily appreciate that any realizable value of x greater than zero provides some improvement over the uncorrected case, but the closer x is to the optimum value, the greater the expected correction.

Figure 15:
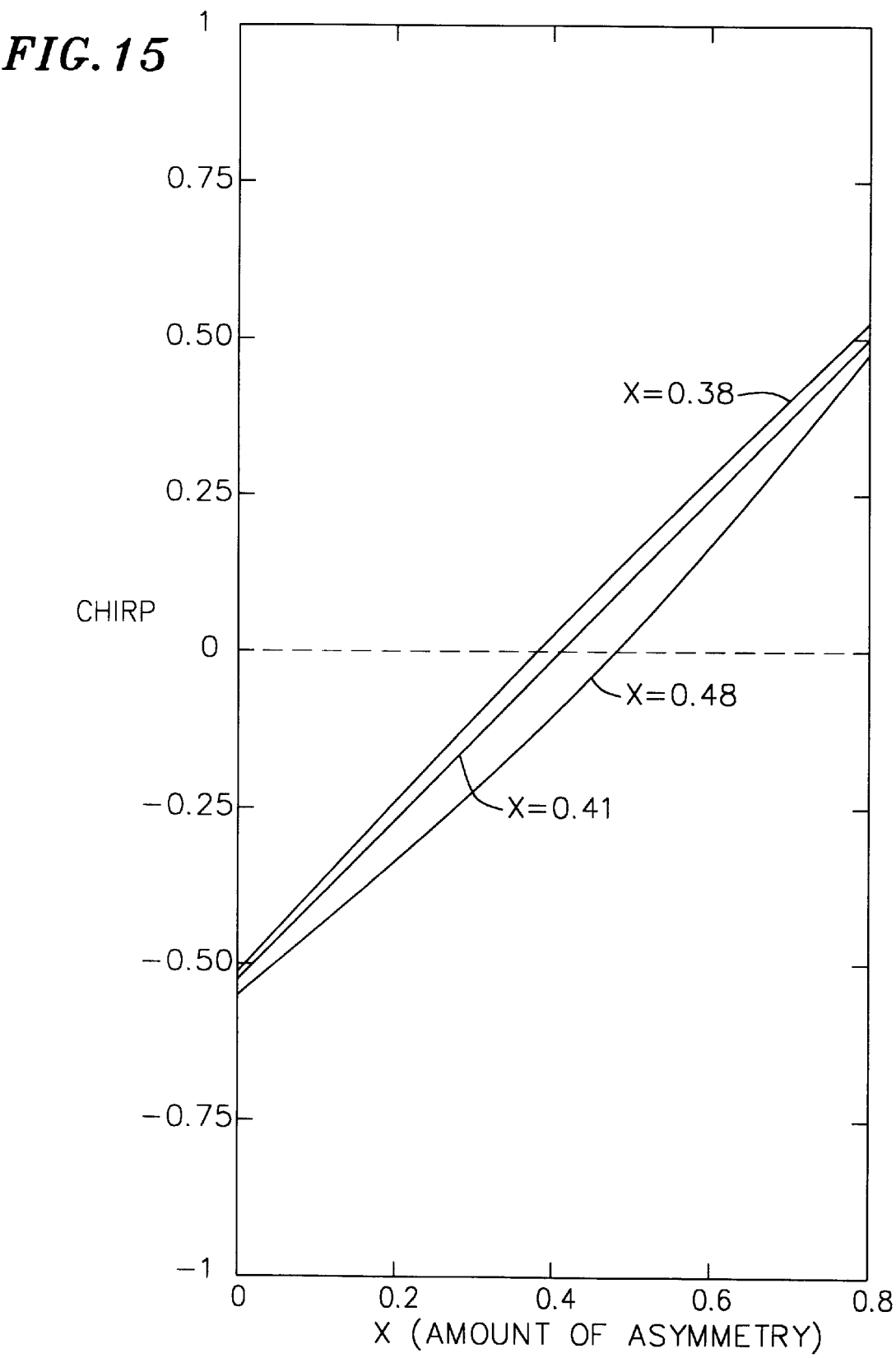
FIG. 15 is a qualitative graphical depiction of chirp vs. amount of asymmetry for exemplary embodiments of the present invention.

FIG. 15 is a plot of chirp vs. amount of asymmetry (x) for each of the exemplary sets of parameters indicated in Table 1. The chirp is defined as $d\phi/dI$, where $\phi$ is the phase of the output signal and I is the output intensity. Additional plots for different parameters can be obtained using commercially available MathCad® software.

Figure 6:
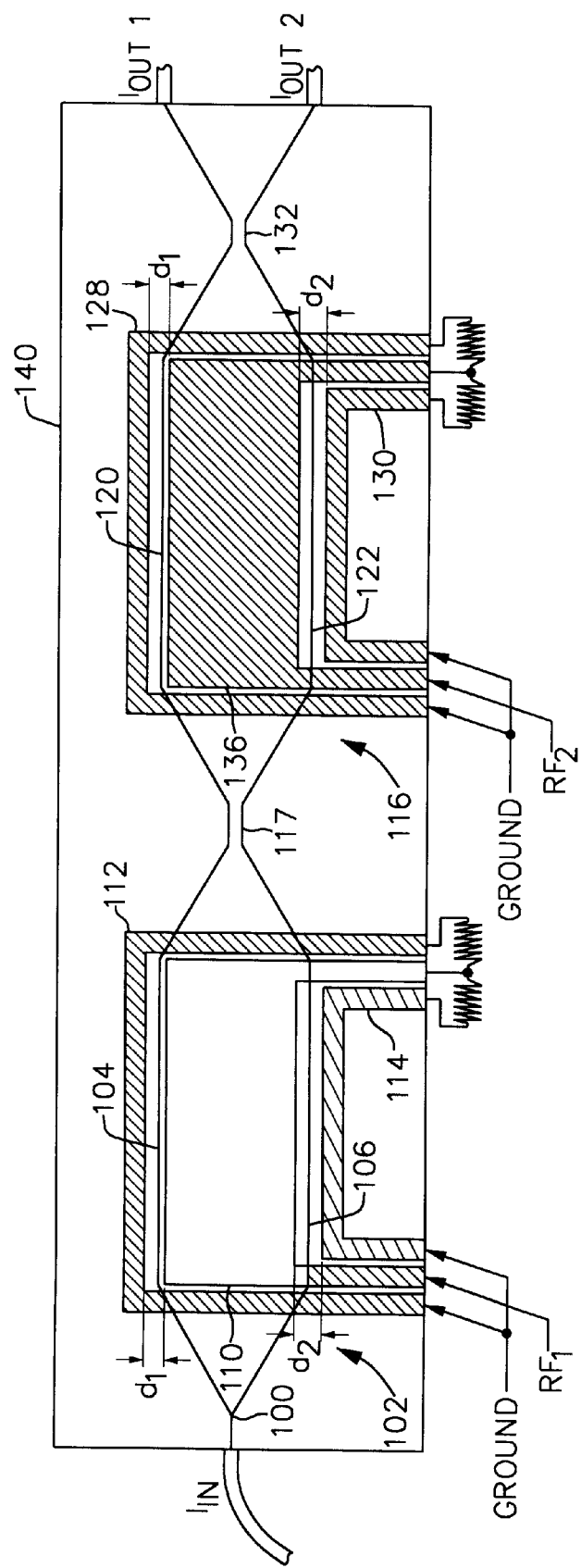
FIG. 6 is a view, partly in cross-section, of the optical modulator of FIG. 4.

Referring to FIG. 6, the modulator is constructed by conventional processes on a lithium niobate substrate 140. The interferometer arms 104, 106, 120, 122 in the first and second interferometers are formed by diffusing titanium into the substrate. RF electrodes 110, 136 and ground electrodes 112, 114, 128, 130 are formed, for example, by depositing a first thin adhesion layer of chrome and a second relatively thicker layer of gold or aluminum on top of the substrate. In this example, each of the electrodes has a U-shape, in which the legs are adapted for connection to RF input pads and ground pads on a printed circuit board (not shown). The bodies of the electrodes are positioned substantially parallel to one another and to the interferometer arms. It should be noted that the interferometer arms and electrode structures disclosed herein are merely exemplary and may be configured in a variety of different ways to implement the teachings of the present invention. For example, another way to fabricate these modulators is by diffusing hydrogen into the substrate. A variant of this process is referred to as annealed proton exchange, currently practiced by United Technologies Corporation, Hartford, Conn.

Figure 7:
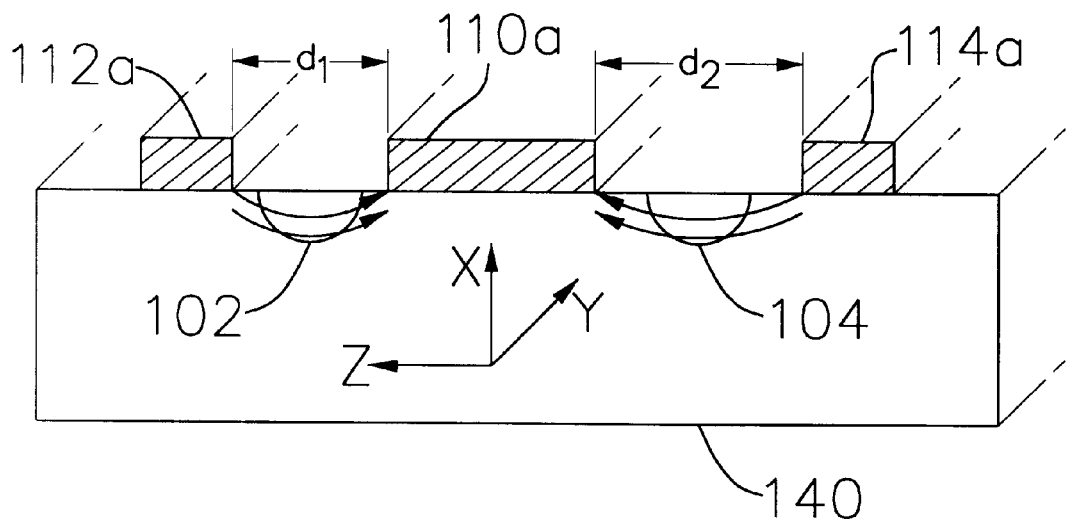
FIG. 7 is a cross-sectional view of an X-cut modulator according to the present invention.
Figure 8:
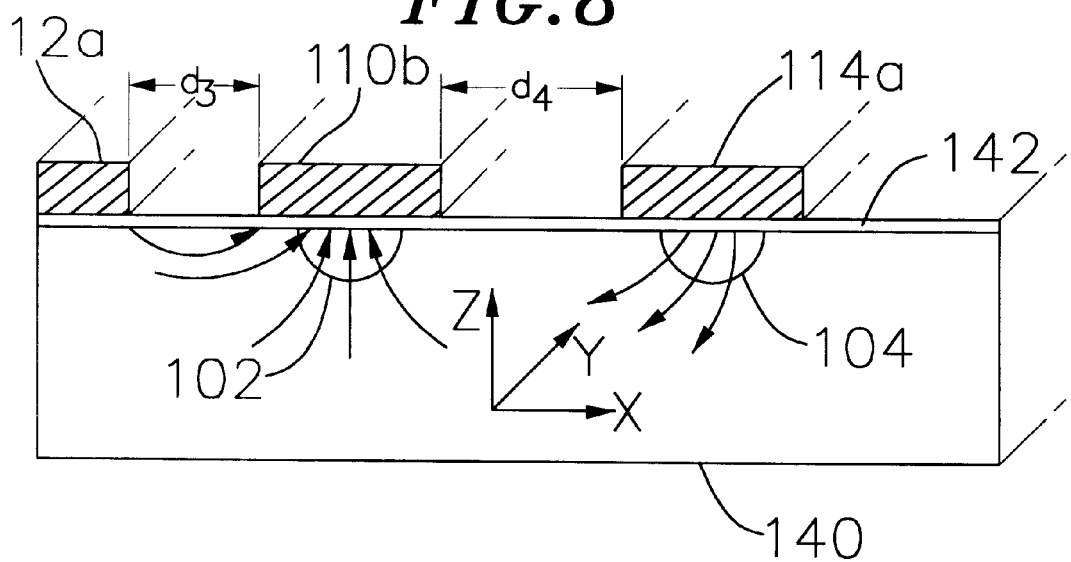
FIG. 8 is a cross-sectional view of a Z-cut modulator according to the present invention.

FIG. 7 is a cross-sectional view of an exemplary X-cut phase/intensity modulator according to the present invention. In this embodiment, the electrodes are deposited adjacent to and on the sides of the interferometer arms 104, 106. The distance d1 between one end of the RF electrode 110a and ground electrode 112a and the distance d2 between the other end of the RF electrode 110a and ground electrode 114a are varied to enable introduction of unequal magnitude electric fields generally directed sideways along the Z-axis. FIG. 8 is a cross-sectional view of one interferometer of a Z-cut chirp-free modulator according to the present invention. In this embodiment, the electrodes are deposited on top of the interferometer arms 104, 106. The distance d3 between one end of the RF electrode 110b and ground electrode 112b and the distance d4 between the other end of the RF electrode 110b and ground electrode 114b are varied to enable introduction of unequal magnitude electric fields generally directed upwardly and downwardly along the Z-axis.

The preferred embodiment of the present invention shown in FIGS. 4–9 in which unequal electrode spacings are used to accomplish the asymmetric electro-optic effects is advantageous because it can be manufactured through minor variation of conventional techniques for producing the exemplary cascaded Mach Zehnder modulator described herein. Furthermore, because the same mask is used to fabricate the first and second electrode structures, acoustic interactions and frequency response are substantially equal in both electrode structures.

Notwithstanding the apparent advantages of the preferred embodiment, the asymmetric relative electro-optic effects can be accomplished in numerous other ways besides through unequally spaced-apart electrodes. Generally speaking, the absolute phase shift induced in a given interferometer arm is:

$$\phi = \frac{n_0^3}{2} r_{eff} E \frac{2\pi L}{\lambda} \quad (10)$$

where $n_o$ is the nominal optical index of refraction; $r_{eff}$ is the effective electro-optic coefficient in the direction of E; E is the net electric field applied across the arm; L is the length over which the field is applied; and $\lambda$ is the optical wavelength. In practice, the phase shift between the signals in the two interferometer arms can be varied by adjusting any of the parameters in equation (10) except the optical wavelength. The most practical parameters to adjust are the electrode length L or the electric field E. In the preferred embodiment of FIG. 4, the asymmetric phase shifts are induced by adjusting the relative electric fields applied to the upper and lower arms.

Referring to FIG. 9, in another embodiment of the present invention, the effective length of the electrodes across the lower interferometer arms 106, 122 in each respective phase/intensity modulator stage is varied relative to the electrodes in the upper arms to accomplish the asymmetric electro-optic effects. In this embodiment, the electric field E remains the same in each arm. In the exemplary embodiment shown, the RF electrode 149 for the first phase/intensity modulator stage 146 has an effective length at its upper end 150 that is greater than the effective length at its lower end 154. Upper and lower first stage ground electrodes 152, 156 have effective lengths that generally correspond to the lengths of the corresponding ends of the RF electrode. Similarly, the RF electrode 151 for the second phase/intensity modulator stage 148 has an effective length at its upper end 158 that is greater than the effective length at its lower end 162. Upper and lower first stage ground electrodes 160, 164 have effective lengths that generally correspond to the lengths of the corresponding ends of the RF electrode. Although shown in a generally trapezoidal shape, the shape of the electrodes should be taken into account for impedance matching and to minimize the effects of fields in other than the desired direction.

By varying the effective lengths for the respective electrodes associated with the upper and lower interferometer arms by the factor (1+x)/(1-x), where x does not equal zero, asymmetric electro-optic effects can be applied to the signals in each of the phase/intensity modulators for implementing the present invention. This embodiment has the advantage of having distances between the RF electrodes and the ground electrodes that are nominally the same.

Referring to FIG. 10, in another alternate embodiment of the present invention, separate pairs of RF electrodes with independently adjustable inputs are provided on each arm of the modulator to enable introduction of the asymmetric electro-optic effects. In this embodiment, a first RF input RF1 is connected to a first electrode set for the upper interferometer arm 104. The electrode set includes an RF electrode 196 and a parallel spaced-apart ground electrode 198 that together straddle the arm. Similarly, a second RF input RF1' is connected to a separate electrode set formed of RF electrode 200 and ground electrode 202 for the lower interferometer arm. By applying unequal voltages to RF1 and RF1', an asymmetric electro-optic effect can be accomplished in the first stage phase/intensity modulator 192. In the second phase/intensity modulator 194, an individual RF input RF2 is connected to another electrode set formed of RF electrode 204 and ground electrode 206 for the upper interferometer arm, and a separate input RF2' is connected to an electrode set formed of RF electrode 208 and ground electrode 210 for the lower interferometer arm. As in the first stage phase/intensity modulator, by applying unequal voltages to RF2 and RF2', an asymmetric electro-optic effect can be accomplished. This embodiment has the advantage of providing a means for adjusting the asymmetric phase shifts in each arm in order to compensate for fabrication errors in each stage and component mismatches, between the coupling angles of first and second directional couplers, for example. It has the further advantage of allowing fine tuning of the modulator to completely eliminate any chirp in the output signal merely by adjusting the RF inputs to each electrode set.

In some situations, it may be useful to unbalance the asymmetric electro-optic effects applied to the split signal in each of the stages. In such a case, the value of x is varied slightly in each stage. As will be appreciated by one of ordinary skill in the art, the particular values of x applied in each modulator stage should not effect the net chirp. In an embodiment having unbalanced stages the average value for x can be taken into account. Accordingly, in any of the embodiments shown, the amount of asymmetry in the first stage can be viewed as x, and the amount of asymmetry in the second stage can be viewed as y. The average of x and y can be used as a rough approximation in place of x in the modulator transfer function for determining the amount of correction.

Figure 11:
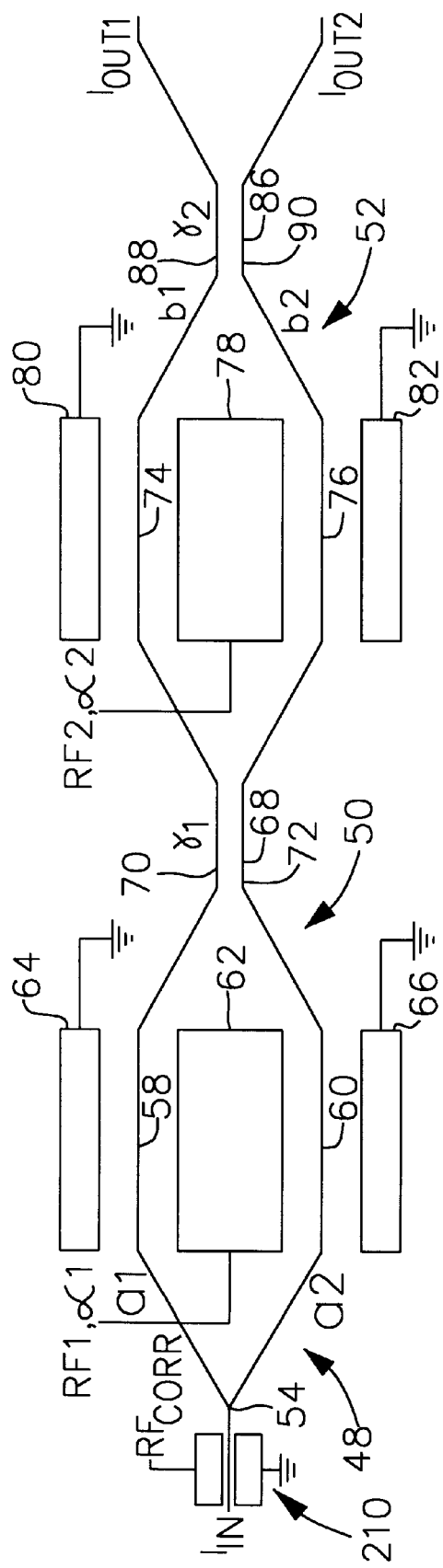
FIG. 11 is a schematic view of still another alternate embodiment of the present invention in which a pair of RF electrodes is provided adjacent the modulator input to enable introduction of a phase shift to the input.
Figure 12:
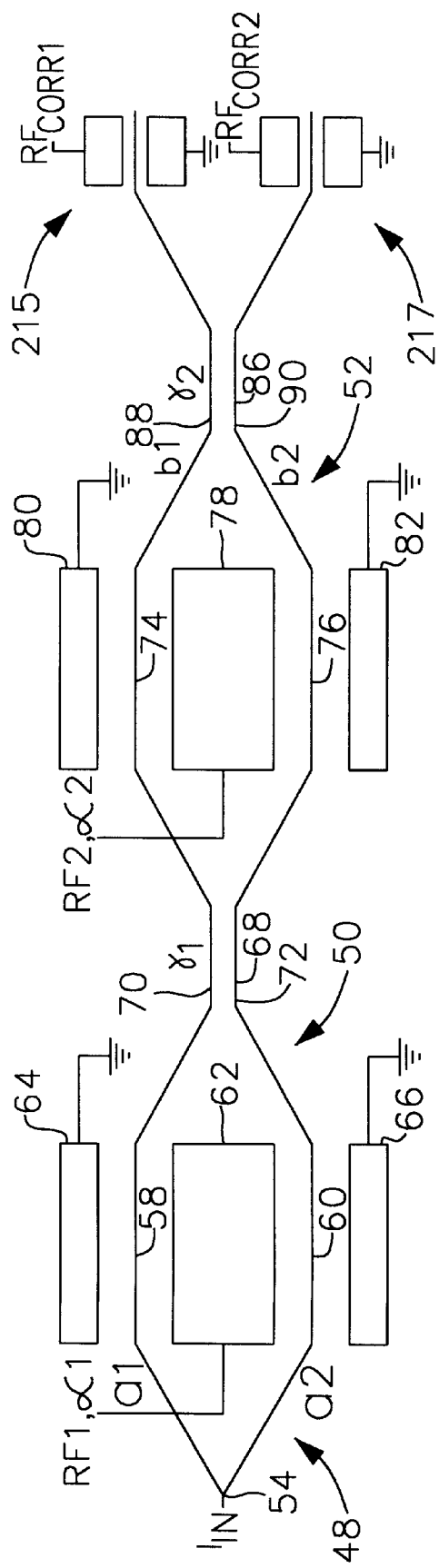
FIG. 12 is a schematic view of still another embodiment of the present invention in which separate pairs of RF electrodes are provided on each of the modulator outputs to enable phase correction on each of the outputs.

FIGS. 11 and 12 illustrate still other embodiments of the present invention. The invention realizes, among other things, that the output of the modulator can be multiplied by a phasor as shown in equation (9) to compensate for the inherent residual phase modulation introduced by the modulator. As shown in FIG. 11, it follows that one can use a phase modulator 210 to apply a phase shift to the input to the modulator to reduce residual phase modulation in at least one of the outputs. Similarly, as shown in FIG. 12, the phase shifts can be applied by phase modulators 215, 217 applied to the upper and lower outputs of the modulators, respectively to achieve the desired correction in each of the outputs. These embodiments have the added advantage of being relatively easy to manufacture, since they require only additions to existing cascaded modulators. However, they also have the disadvantage of requiring a longer lithium niobate substrate on which to place the additional modulator or modulators.

Figure 13:
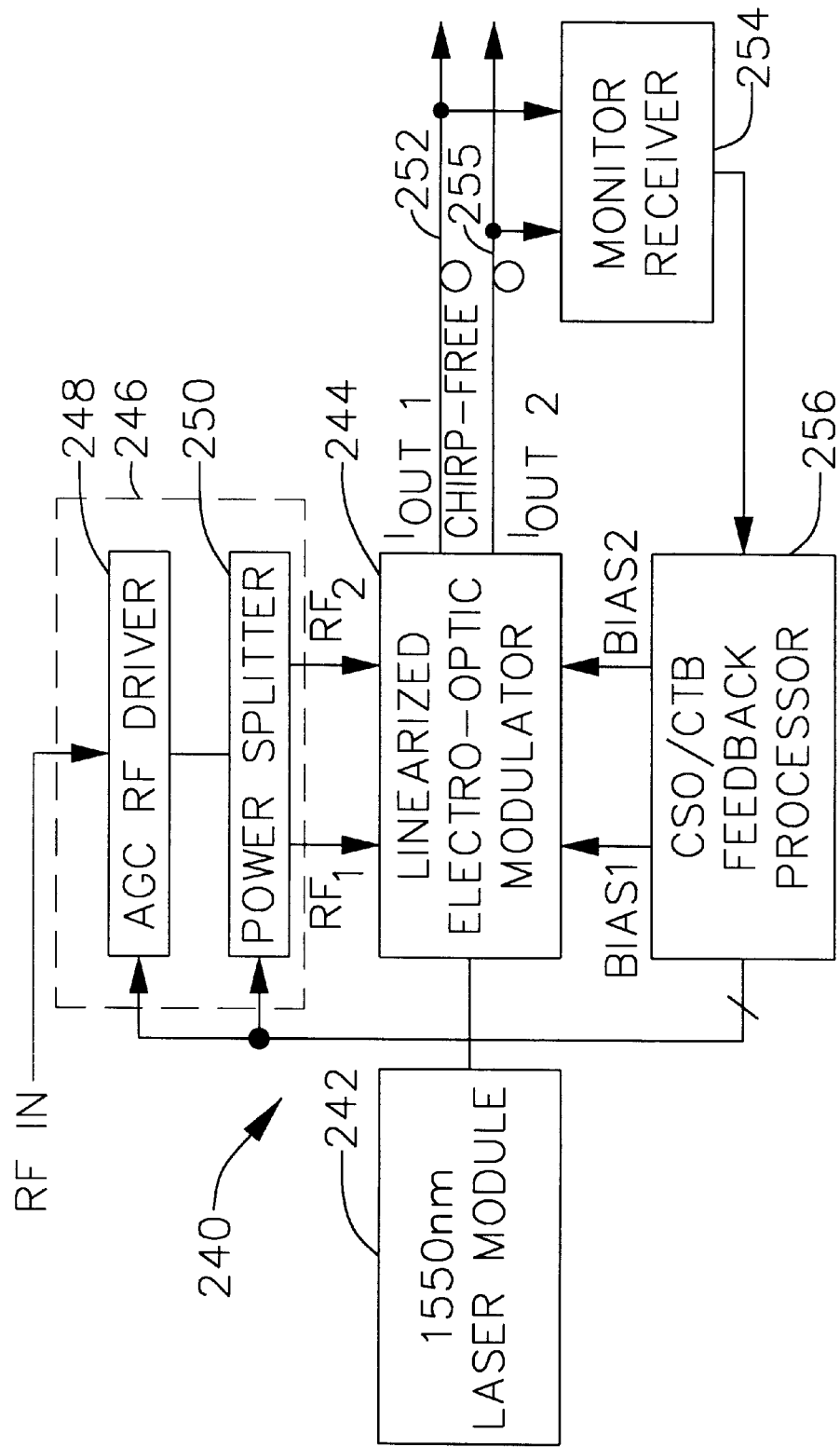
FIG. 13 is a block diagram of an externally modulated transmitter according to the present invention in which one of the optical output signals is used to provide feedback for optimizing modulator linearity.

Referring to FIG. 13 the optical modulator according to the present invention can also be used in a feedback control system 240 in which one or more of the optical output signals 252, 255 is used to provide feedback for optimizing modulator linearity. In this system, a CW laser 242 provides an optical signal $I_{IN}$ to an external modulator 244 designed according to the teachings of the present invention. An RF modulating voltage carrying information for modulating the optical signal is split in a splitter 246 including power driver 248 and power splitter 250 to provide first and second modulating signals RF1 and RF2 to the modulator. In the embodiment of FIG. 10, additional splitters (not shown) can be employed to further split RF1 and RF2 for application to the upper and lower electrode sets. The modulator provides a pair of optical output signals $I_{OUT1}$ and $I_{OUT2}$. $I_{OUT1}$, which is free of any residual phase modulation, can be introduced into a 1310 nm optimized optical fiber 252 for transmission without chirp-induced dispersion penalty to a remote optical receiver (not shown). Both $I_{OUT1}$ on cable 252 and $I_{OUT2}$ on cable 255, are provided as feedback to a monitor 254 which monitors the signal second and third order distortion components. Information gathered from the feedback signal is then used in a CSO/CTB processor 256 to adjust the splitting ratio k between RF1 and RF2 and the DC bias levels applied to each stage of the modulator for optimizing linearity. In practice, based on distortion in the output signal the bias is adjusted, to minimize second and higher even order effects, and the splitting ratio is adjusted to minimize third order effects and higher odd order effects, if present.

Although various embodiments of the present invention have been described herein, those skilled in the art will realize that numerous modifications can be made without departing from the spirit and scope of the present invention. For example, the Y-junction used to initially split the signal can be replaced by a directional coupler. Therefore, the scope of the present invention should not be limited but should instead be read in light of the following claims.

What is claimed is:

1. An optical modulator comprising:
   an input splitter for splitting an optical signal into at least two parts;
   a first interferometer including a plurality of interferometer arms for transmitting the parts of the split optical signal and means for inducing an asymmetric electro-optic effect in the two parts of the optical signal;
   a second interferometer including a plurality of interferometer arms and means for inducing an asymmetric electro-optic effect in the two parts of the optical signal;
   first means for coupling the two parts of the optical signal after passing through the first interferometer and separating the optical signal into at least two parts which are transmitted through the second interferometer; and
   second means for coupling the two parts of the optical signal from the second interferometer and for providing first and second optical output signals;
   wherein chirp induced in one of the parts of the optical signal in the first interferometer is reduced in at least one of the optical output signals.

2. The optical modulator of claim 1 further comprising:
   a first RF input means for applying a first RF modulating signal to the means for inducing an asymmetric electro-optic effect in the first interferometer;
   first bias means for biasing the first RF modulating signal;
   a second RF input means for applying a second RF modulating signal to the means for inducing an asymmetric electro-optic effect in the second interferometer; and
   second bias means for biasing the second RF modulating signal.

3. The optical modulator of claim 2 wherein the ratio of the first and second RF modulating signals and levels of the biases for the first and second RF modulating signals are selected for minimizing second and third order distortion in at least one of the optical output signals.

4. The optical modulator of claim 2 further comprising feedback means for adjusting one or more of the RF modulating signals or biases as a function of at least one of the optical output signals for minimizing distortion in at least one of the optical output signals.

5. The optical modulator of claim 1 wherein the means for inducing the asymmetric electro-optic effects in the two parts of the signal in the first interferometer comprises a modulating electrode, the electrode including an RF modulating portion and first and second ground portions, wherein the modulating portion is positioned asymmetrically between the first and second ground portions.

6. The optical modulator of claim 1 wherein the means for inducing the asymmetric electro-optic effects in the two parts of the signal in the first interferometer comprises a modulating electrode, the electrode including a modulating portion and first and second ground portions, wherein effective length of the first ground portion differs from length of the second ground portion.

7. The optical modulator of claim 1 wherein the means for inducing the asymmetric electro-optical effect in the two parts of the signal in the first interferometer comprises a first modulating electrode for the part of the signal in the first interferometer arm and a second modulating electrode for the part of the signal in the second interferometer arm, wherein each electrode is connected to a separate RF modulating signal input.

8. The optical modulator of claim 1 wherein the means for inducing the asymmetric electro-optical effects in the two parts of the signal in the first interferometer comprises applying electric fields having different magnitudes to each of the interferometer arms, and wherein the ratio of the magnitudes of the respective applied electric fields is (1+x)/(1−x), wherein x is in the range from 0.25 to 0.55.

9. The optical modulator of any one of claim 1 wherein the means for applying the asymmetric electro-optic effect to the two parts of the signal in the second interferometer has a structure that is substantially similar to the means for applying the asymmetric electro-optic effect to the two parts of the signal in the first interferometer.

10. The optical modulator of claim 1 wherein the optical modulator is fabricated on a single lithium niobate substrate.

11. The optical modulator of claim 1 wherein the means for coupling the two parts of the optical signal after passing through the first interferometer is a directional coupler.

12. An optical modulator comprising:
    a substrate;
    an input for receiving an optical input signal;
    a first modulator stage formed on the substrate, the first modulator stage comprising upper and lower first stage waveguide paths, a Y-junction splitter coupled to the input for splitting the optical signal into the upper and lower first stage waveguide paths, and first stage modulator means for applying an electric field across each of the first stage waveguide paths, wherein the ratio of the respective electric fields applied to the upper and lower first stage paths is (1+x)/(1−x);
    a second modulator stage formed on the substrate, the second modulator stage comprising upper and lower second stage waveguide paths, and second stage modulator means for applying an electric field across each of the second stage waveguide paths, wherein the ratio of the respective electric fields applied to the upper and lower second stage paths is (1+y)/(1−y);
    a first coupler having coupling angle γ1 connected between the first and second modulator stages for mixing the split optical signals from the first stage waveguide paths and delivering the mixed signals into the second stage waveguide paths; and
    a second coupler having coupling angle γ2 connected to the second stage waveguide paths for coupling output of the second stage waveguide paths and producing first and second optical output signals,
    wherein the values of x, y, γ1 and γ2 are chosen so that any residual phase modulation exhibited by at least one of the optical output signals is decreased.

13. The optical modulator of claim 12 wherein the substrate is made of lithium niobate crystal.

14. The optical modulator of claim 12 wherein the residual phase modulation is decreased by 50% relative to an uncorrected modulator in which x and y are nominally zero.

15. The optical modulator of claim 12 wherein the first stage modulator means comprises an electrode structure including:
   a modulating electrode positioned between the first stage waveguide paths, the modulating electrode having first and second sides;
   a first ground electrode located a distance d1 from the first side of the modulating electrode; and
   a second ground electrode located a distance d2 from the second side of the modulating electrode, wherein d1 and d2 are chosen to produce the respective electric fields in the first stage paths related by the ratio $(1+x)/(1-x)$.

16. The optical modulator of claim 15 wherein the second stage modulator means comprises an electrode structure including:
   a modulating electrode positioned between the second stage waveguide paths, the modulating electrode having first and second sides;
   a first ground electrode located a distance d1 from the first side of the modulating electrode; and
   a second ground electrode located a distance d2 from the second side of the modulating electrode, wherein d1 and d2 are chosen to produce the electric fields in the second stage paths having the ratio $(1+y)/(1-y)$.

17. The optical modulator of claim 12 wherein the second stage modulator means comprises an electrode structure including:
   a modulating electrode positioned between the second stage waveguide paths, the modulating electrode having first and second sides;
   a first ground electrode located a distance d1 from the first side of the modulating electrode; and
   a second ground electrode located a distance d2 from the second side of the modulating electrode, wherein d1 and d2 are chosen to produce the electric fields in the second stage paths having the ratio $(1+y)/(1-y)$.

18. The optical modulator of claim 12 wherein x is substantially equal to y, and the first coupler coupling angle $\gamma 1$ is substantially equal to the second coupler coupling angle $\gamma 2$.

19. The optical modulator of claim 12 further comprising first RF input means for applying a first RF modulating signal RF1 to the first stage modulator means and second RF input means for applying a second RF modulating signal RF2 to the second stage modulator means, wherein bias levels of RF1 and RF2 are chosen to decrease third order distortion in the optical output signals.

20. The optical modulator of claim 12 further comprising means for monitoring at least one of the optical output signals and using the signal to adjust bias levels applied to first and second modulator means.

21. A method for providing an optical output signal that is substantially chirp-free, the method comprising the steps of:
   separating an optical signal into first and second optical signal parts;
   applying a first asymmetric phase shift to the first and second optical signal parts;
   coupling the first and second optical signal parts such that at least some of the residual phase shift on at least one of the optical signal parts caused by the application of the first asymmetric phase shift is canceled;
   separating the coupled optical signal parts into third and fourth separated optical signal parts;
   applying a second asymmetric phase shift to the third and fourth separated optical signal parts and coupling the separated third and fourth optical signal parts to provide at least one optical output signal, wherein any residual phase shift on at least one of the third or fourth optical signal parts caused by the application of the first or second asymmetric phase shifts is substantially canceled.

22. The method of claim 21 wherein the step of separating the optical signal into first and second optical signal parts comprises evenly splitting power of the signal.

23. The method of claim 21 wherein the step of applying the first asymmetric phase shift to the first and second optical signal parts comprises applying respective phase shifts to the first and second signals in the ratio $(1+x)/(1-x)$ where x is in the range from 0.25 to 0.55.

24. The method of claim 21 wherein the step of coupling the first and second optical signal parts comprises mixing the signals in unequal proportions.

25. The method of claim 21 wherein the step of applying the second asymmetric phase shift to the third and fourth separated optical signal parts comprises applying respective phase shifts to the first and second signals in the ratio $(1+x)/(1-x)$ where x is in the range from 0.25 to 0.55.

26. The method of claim 21 wherein the step of coupling the separated third and fourth optical signal parts comprises mixing the signals in unequal proportions.

27. The method of claim 21 wherein the step of coupling the first and second optical signal parts and coupling the third and fourth signal parts comprises coupling the signals in substantially the same unequal proportions.

28. An optical modulator comprising:
   a first phase/intensity modulator for intensity modulating and inducing a residual phase shift in an optical signal;
   first means for reversing at least some of the residual phase shift induced in the optical signal by the first phase/intensity modulator;
   a second phase/intensity modulator for intensity modulating and inducing residual phase shift in the optical signal; and
   second means for reversing at least some of the residual phase shift induced in the optical signal by the second phase/intensity modulator.

29. The optical modulator of claim 28 wherein the first and second means for reversing at least some of the residual phase shift reverse substantially all of the residual phase shift together appearing in the optical signal.

30. An optical modulator comprising:
   an input for receiving an optical signal;
   a first modulator coupled to the input for applying a first phase modulation to the signal;
   a power divider coupled to the first modulator for dividing the signal into two parts;
   a first interferometer modulator coupled to the power divider for applying a second phase modulation to the signal;
   a first directional coupler coupled to the first interferometer modulator;
   a second interferometer modulator coupled to the first directional coupler for applying a third phase modulation to the signal;
   a second directional coupler coupled to the second interferometer modulator; and an output coupled to the second directional coupler for providing first and second output signals;

wherein residual phase modulation in at least one of the output signals is substantially reduced by applying a phase modulation at the input using the first phase modulator that cancels residual phase modulation applied by the first and second interferometer modulators.

31. An optical modulator comprising:

an input for receiving an optical signal;

a power divider coupled to the input for dividing the signal into two parts;

a first modulator coupled to the power divider for applying a first phase modulation to the signal;

a first directional coupler coupled to the first modulator;

a second modulator coupled to the first directional coupler for applying a second phase modulation to the signal;

a second directional coupler coupled to the second modulator;

an output coupled to the second directional coupler for providing first and second output signals; and a phase modulator coupled to the output for phase modulating the signal for reversing residual phase modulation applied to at least one of the output signals by the first and second modulators.

* * * * *